United States Patent
Lemus et al.

(10) Patent No.: US 8,499,343 B2
(45) Date of Patent: Jul. 30, 2013

(54) HOSTED MEDIA CONTENT SERVICE SYSTEMS AND METHODS

(75) Inventors: Anthony M. Lemus, Irving, TX (US); Velmurugan Krishnaswamy, Irving, TX (US); Chukuemeka Okonkwo, Irving, TX (US); Chivas Nambiar, Brookline, MA (US); Aravind Perumandla, Irving, TX (US); Ashraf M. Shehata, Tampa, FL (US); Rickey A. Davis, Jr., Thonotosassa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 47 days.

(21) Appl. No.: 13/153,857

(22) Filed: Jun. 6, 2011

(65) Prior Publication Data

US 2012/0311688 A1 Dec. 6, 2012

(51) Int. Cl.
*H04L 29/06* (2006.01)
(52) U.S. Cl.
USPC ............... 726/8; 726/9; 726/10; 713/150
(58) Field of Classification Search
USPC .................................. 726/8, 9, 10
See application file for complete search history.

(56) References Cited

U.S. PATENT DOCUMENTS

| | | | |
|---|---|---|---|
| 2003/0188193 A1* | 10/2003 | Venkataramappa | 713/201 |
| 2003/0217288 A1* | 11/2003 | Guo et al. | 713/201 |
| 2006/0274695 A1* | 12/2006 | Krishnamurthi et al. | 370/331 |
| 2007/0180503 A1* | 8/2007 | Li et al. | 726/5 |
| 2010/0125881 A1* | 5/2010 | Douma et al. | 725/87 |

* cited by examiner

*Primary Examiner* — Yogesh Paliwal

(57) ABSTRACT

An exemplary system includes 1) at least one computing device within a first computing subsystem associated with a hosted media content service, the at least one computing device configured to authenticate a user to the hosted media content service and provide at least one encrypted token to a user device associated with the user, and 2) at least one other computing device within a second computing subsystem associated with the hosted media content service, the at least one other computing device configured to store hosted media content associated with the hosted media content service, receive the at least one encrypted token from the user device, validate the at least one encrypted token, and perform, in response to the validation, at least one action on media content as part of the hosted media content service. Corresponding methods and systems are also disclosed.

25 Claims, 10 Drawing Sheets

HOSTED MEDIA CONTENT SERVICE SYSTEMS AND METHODS

BACKGROUND INFORMATION

As digital media technologies have advanced, personal digital media collections have grown in size and popularity. A typical personal digital media collection, which may include numerous photos, songs, e-books, audio books, movies, videos, and/or other forms of media content, may be stored locally on a user's device (e.g., a personal computer) or hosted at a remote data center.

A hosted media content service allows a user to upload personal digital media content to hosted storage at a service provider's data center. Thereafter, the user may utilize any suitable access device to authenticate the user to the data center and access the hosted personal media content through the service.

One of the challenges faced by a hosted media content service provider is ensuring the security of hosted media content. To this end, the hosted media content service is typically configured to provide access to media content only to authenticated and authorized users, thereby protecting the hosted media content from access by unauthenticated and/or unauthorized users.

Another of the challenges faced by a hosted media content service provider is providing sufficient computing resources to handle significant computing resource demands associated with hosting media content. Without sufficient computing resources, the hosted media content service may be adversely affected (e.g., by delayed and/or unacceptable response times), which may lead to dissatisfaction among users of the service.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
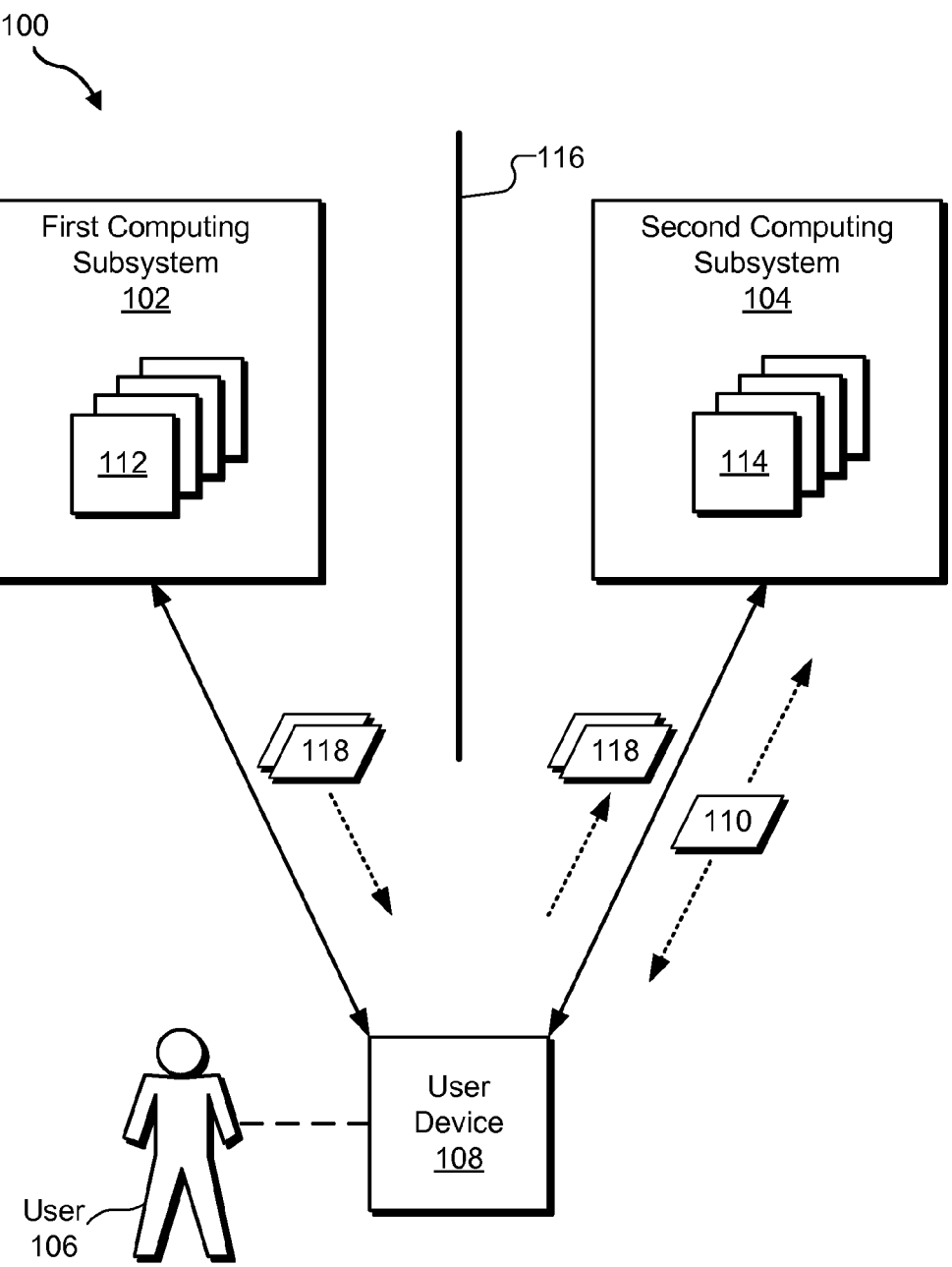
FIG. 1 illustrates an exemplary media content hosting system according to principles described herein.

Hosted media content service systems and methods are disclosed herein. As described in detail herein, a hosted media content service may be provided by a first computing subsystem and a second computing subsystem each configured to provide certain functionality of the service. For example, the first computing subsystem may be configured to provide authentication and/or application functionality for the service, and the second computing subsystem may be configured to receive and store uploaded media content and to grant access to and deliver hosted media content, as described herein. Such a configuration may leverage one or more computing resources of the second computing subsystem for use in receiving, storing, and/or delivering media content. For example, the second computing subsystem may provide greater bandwidth capacity than the first computing subsystem, and the bandwidth capacity of the second computing subsystem may be leveraged by offloading media content upload, storage, and delivery functionality from the first computing subsystem to the second computing subsystem.

The first computing subsystem and the second computing subsystem are separate from one another. The separation between the computing subsystems may be due to any of a number of characteristics of the computing subsystems. In certain embodiments, for example, the computing subsystems may be located within different physical sites. For instance, the first computing subsystem may be located within a first physical location, and the second computing subsystem may be located within a second physical location. Additionally or alternatively, the computing subsystems may be logically and/or communicatively separate. For instance, as described in detail herein, the computing subsystems may be configured to not communicate with one another in relation to certain functionality provided by either of the computing subsystems as part of the hosted media content service. By not communicating with one another in relation to certain service functionality, response times related to the service may be faster than they would be if the computing subsystems communicated with one another in relation to the service functionality. For example, requests received by the second computing subsystem to upload or access media content may be fulfilled faster than they would be if the computing subsystems communicated with one another in order to fulfill the requests.

The separation between the computing subsystems creates one or more challenges to ensuring the security of the service and the hosted media content. For example, the first computing subsystem may provide functionality for authenticating a user to the service. However, the second computing subsystem may not be equipped to authenticate the user to the service. For example, a provider of the service may not want to equip the second computing subsystem with computing resources needed to provide authentication functionality. In addition, re-authenticating a user who has already been authenticated by the first computing subsystem may be inefficient, lengthen service response times, and/or require additional communications between the second computing subsystem and a user device. For these or similar reasons, the service provider may not want to configure the second computing subsystem to communicate with the first computing subsystem to verify that a user has been authenticated by the first computing subsystem.

To protect the security of the service and/or the media content hosted as part of the service, the first and second computing subsystems are configured to perform token-based operations. For example, as described in more detail herein, the first computing subsystem may be configured to provide at least one encrypted token to a user device, which may be configured to forward the encrypted token(s) to the second computing subsystem. The second computing subsystem may be configured to receive and validate the encrypted token(s) before fulfilling a request to process media content (e.g., a request to upload or access media content). Validation of the encrypted token(s) may provide assurance that the request to process media content is received from an authenticated and authorized user. Accordingly, the encrypted token(s) may be used to protect media content from unauthenticated and/or unauthorized processing (e.g., unauthenticated and/or unauthorized upload and/or access).

FIG. 1 illustrates an exemplary hosted media content service system 100 (or simply "system 100") that includes a first computing subsystem 102 and a second computing subsystem 104 configured to provide a hosted media content service. The hosted media content service may allow a user of the service to upload media content for hosted storage, access the hosted media content, and/or otherwise manage the hosted media content. In some examples, the service may facilitate offloading of media content storage from one or more computing devices associated with a user (e.g., operated by the user) to one or more computing devices associated with a provider of the service (e.g., operated by the service provider). The service provider may provide the service as a free service or a paid service (e.g., a subscription service).

To illustrate, a user 106 may utilize a user device 108 to access the service. Through the service, user 106 utilizing user device 108 may upload media content for hosted storage and/or access hosted media content. For example, user 106 utilizing user device 108 may upload personal digital media content (e.g., photos, songs, e-books, audio books, movies, videos, and/or other forms of media content) for hosted storage. User 106 utilizing user device 108 may also access the hosted personal digital media content. Accordingly, user's 106 personal collection of media content may be uploaded and stored in hosted storage for access by user 106 utilizing user device 108 or any other suitable access device.

In certain examples, user 106 is a person who has established an account with the service, such as by registering with the service and defining and providing user credentials (e.g., a user name and password) that may be used in the future by user 106 to gain access to the service. As described herein, first computing subsystem 102 may authenticate user 106 to the service based on the user credentials. The authentication helps ensure that the service and the media content hosted as part of the service are secure and protected from access by unauthenticated users.

In certain examples, user 106 is authorized to access only hosted media content that is associated with user 106. For example, user 106 may be authorized to access only hosted media content that has been uploaded by user 106. This helps ensure that the service and the media content hosted as part of the service are secure and protected from access by unauthorized users.

User device 108 may include any computing device associated with user 106 (e.g., operated by user 106) and capable of communicating with first and second computing subsystems 102 and 104 to access and use the hosted media content service. User device 108 may be configured to store media content locally, transmit media content, receive media content, present media content, or process media content in any other way. An exemplary user device 108 may include, without limitation, a media player device, a mobile phone device, a smartphone device, a tablet computer, a personal computer, a laptop computer, a personal digital assistant device, an e-reader device, a gaming device, a set-top box device, a digital video recording device, an audio capture device, a camera, and any other device configured to perform the user device operations disclosed herein. While FIG. 1 shows a single user device 108 associated with user 106, this is illustrative only. User 106 may be associated with any number of user devices that may be used to access the hosted media content service provided by first and second computing subsystems 102.

First computing subsystem 102 may be configured to provide authentication functionality of the hosted media content service. In particular, first computing subsystem 102 may be configured to authenticate user 106 to the service. Access to the service is provided only after user 106 is authenticated. First computing subsystem 102 may include any suitable user authentication technologies and/or resources. In certain examples, first computing subsystem 102 may employ a secure-sign-on technology such as a single-sign-on ("SSO") technology that compares user credentials received from user device 108 to previously defined user credentials registered with the service and stored within first computing subsystem 102. If a match is found, the user associated with the user credentials is authenticated and granted access to the service. Such authentication may occur for an initial login when the user requests to begin a session with the service and/or for a subsequent login, re-authentication request, or session renewal request when a session has timed out or is about to time out.

First computing subsystem 102 may be further configured to provide certain application functionality of the hosted media content service. For example, first computing subsystem 102 may provide functionality for interactions between user 106 and the service, including, for example, user interfaces associated with the service, information and/or graphics to populate user interfaces associated with the service, user selectable options associated with the service (e.g., a media content upload or access option), and navigation capabilities for navigating, searching for, and selecting hosted media content. First computing subsystem 102 may further provide functionality for indexing hosted media content, managing hosted media content, and/or other application functionality associated with the service.

Certain functionality associated with the service may be offloaded from or otherwise not provided by first computing subsystem 102. For example, functionality for uploading, storing, and delivering media content may be provided by second computing subsystem 104 rather than by first computing subsystem 102. Accordingly, an upload of media content may include user device 108 transmitting the media content to second computing subsystem 104, which may receive and store the uploaded media content in hosted storage within second computing subsystem 104. Similarly, an accessing of hosted media content by user device 108 may include second computing subsystem 104 receiving a request for the hosted media content from user device 108, granting access to the hosted media content, and transmitting the hosted media content to user device 108. Media content 110 shown in FIG. 1 illustrates that media content may be uploaded from user device 108 to second computing subsystem 104 and/or delivered from second computing subsystem 104 to user device 108.

Offloading media content upload, storage, and delivery functionality to second computing subsystem 104 may provide one or more benefits, including any of those disclosed herein. For example, second computing subsystem 104 may have more bandwidth capacity than first computing subsystem 102, which increased bandwidth capacity may allow the hosted media content service to be made available to more users, handle an increased volume of media content (e.g., handle an increased volume of media content uploads and downloads), and/or fulfill user requests faster than the service would be able to if media content upload, storage, and/or delivery functionality were provided by first computing subsystem 102.

First computing subsystem 102 may include at least one computing device 112 configured to provide functionality of first computing subsystem 102, including any of the functionality described herein. Second computing subsystem 104 may include at least one other computing device 114 configured to provide functionality of second computing subsystem 104, including any of the functionality described herein. The computing devices within subsystems 102 and 104 may include any type, form, and/or number of computing devices suitable for providing the functionality. Examples of such computing devices include, without limitation, one or more servers (e.g., web servers, application servers, authentication servers), routers, switches, data storage devices, power supplies, network interface devices, etc. One or more of such computing devices may be configured to form a computing system within first computing subsystem 102 and another computing system within second computing subsystem 104.

As described above, second computing subsystem 104 is separate from first computing subsystem 102. Accordingly, the computing system formed by computing devices 114 within second computing subsystem 104 is separate from the computing system formed by computing devices 112 within first computing subsystem 102. Line 116 shown in FIG. 1 represents a separation of first and second computing subsystems 102 and 104 (and their respective sets of computing devices 112 and 114) from one another.

Figure 2:
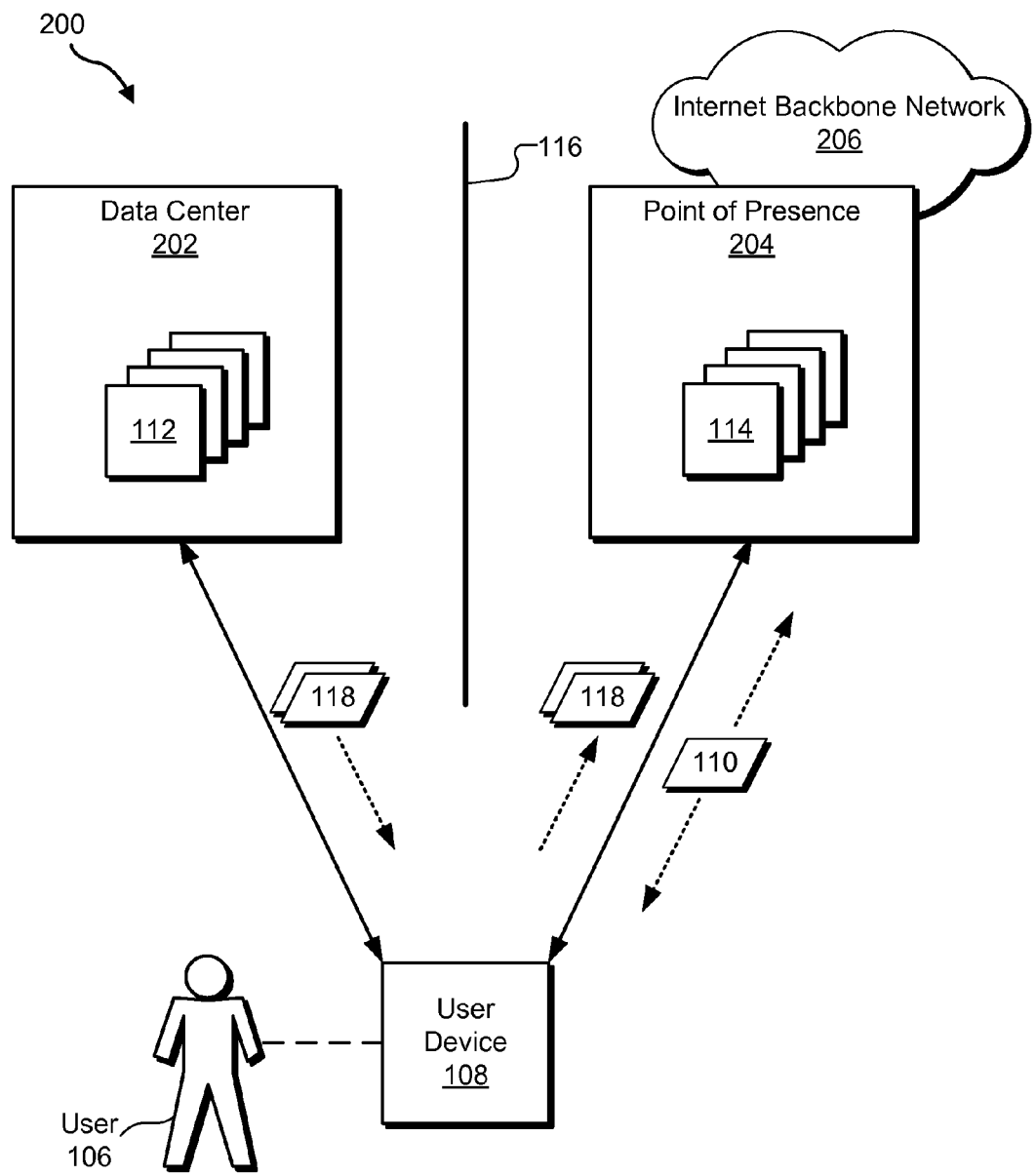
FIG. 2 illustrates an exemplary implementation of the system of FIG. 1 according to principles described herein.

In certain embodiments, first computing subsystem 102 may include a data center and second computing subsystem 102 may include a point of presence ("POP"), such as a POP to a high-speed and/or high-bandwidth network (e.g., an Internet backbone network). FIG. 2 illustrates an exemplary implementation 200 of system 100 in which first computing subsystem 102 includes a data center 202 and second computing subsystem 104 includes a POP 204 to an Internet backbone network 206 (e.g., POP 204 may include a point at which one or more Internet access networks meet the backbone of the Internet). In implementation 200, one or more computing devices 112 may be configured to form a data center computing system within data center 202 and to provide certain functionality of the hosted media content service, and one or more other computing devices 114 may be configured to form a POP computing system within POP 204 and to provide certain other functionality for the hosted media content service. For example, data center 202 may include one or more authentication applications, servers, and/or databases configured to provide functionality for authenticating user 106 to the service. As another example, data center 202 may include one or more applications servers, web servers, and/or databases configured to provide application-level functionality for the service (e.g., a media manager application for managing hosted media content). POP 204 may include one or more servers, databases, data storage devices, and/or other computing devices configured to provide the functionality of the POP 204, which may include any of the functionality of second computing subsystem 104 described herein.

POP 204 may be separate from data center 202, as indicated by line 116 in FIG. 2, for any of the reasons described herein in relation to first and second computing subsystems 102 and 104. For example, data center 202 and POP 204 may be located at separate physical sites. Additionally or alternatively, in certain examples, POP 204 may be configured to not communicate with data center 202 in relation to certain functionality of POP 204, such as validation of tokens as described herein.

The separation between first and second computing subsystems 102 and 104 of system 100 (or data center 202 and POP 204 in implementation 200) described herein may limit the access that the second computing subsystem 104 has to functionality provided by the first computing subsystem 102 and vice versa. For example, because second computing subsystem 104 is separate from first computing subsystem 102, second computing subsystem 104 may not readily have access to authentication functionality provided by first computing subsystem 102. Without such access, or without its own integrated authentication functionality, second computing subsystem 104 may not be equipped to authenticate a user associated with a request to process media content (e.g., a request to upload or access media content). This may expose the hosted media content service to security breaches through second computing subsystem 104. Such a threat may be unacceptable to the service provider and/or users of the service.

To address this problem, system 100 is configured to perform token-based operations to protect the hosted media content service, including the hosted media content stored within second computing subsystem 104, from unauthenticated and unauthorized access. When tokens are validated by second computing subsystem 104 as described herein, second computing subsystem 104 may fulfill content requests with an assurance that the requests are received from users that are authenticated by first computing subsystem 102 and authorized to request processing of particular media content.

To illustrate, as shown in FIG. 1, first computing subsystem 102 may provide at least one encrypted token 118 to user device 108, and user device 108 may forward the at least one encrypted token 118 to second computing subsystem 104. User device 108 may be preconfigured to store an address (e.g., a Uniform Resource Locator or other address) associated with second computing subsystem 104 to which user device 108 forwards the at least one encrypted token 118. Alternatively, user device 108 may receive data representative of an address (e.g., a URL or http post) associated with second computing subsystem 104 in association with the receipt of at least one encrypted token 118. Accordingly, user device 108 may identify where to forward content requests and encrypted tokens and may forward the requests and the tokens transparently to user 106.

User device 108 is not configured to decrypt the at least one encrypted token 118 received from first computing subsystem 102. Accordingly, the encryption of the token protects data included in the token from being accessed at user device 108.

In some examples, user device 108 may provide the at least one encrypted token 118 to second computing subsystem 104 in association with a content request (e.g., a request to upload, access, or otherwise process media content). Second computing subsystem 104 may receive and validate the at least one encrypted token 118 before performing at least one action on media content to fulfill the content request. If the at least one token 118 is not validated, second computing subsystem 104 does not fulfill the content request.

An encrypted token may include any data that may be used by second computing subsystem 104 to validate the token in order to determine, with a level of assurance that is acceptable to a service provider, that a content request associated with the token is from an authenticated and authorized user. For example, an encrypted token may include encrypted data representative of a user identifier indicating a user associated with a content request, a content identifier indicating a particular instance or set of media content associated with the content request, a time constraint indicating a period of time within which a content request is valid, one or more timestamps, any other suitable information, or any combination or sub-combination thereof. Exemplary tokens (e.g., an exemplary time token and content token) are described in detail below.

Validation of one or more tokens by second computing subsystem 104 may include one or more operations configured to determine, with a level of assurance that is acceptable to a servicer provider, whether a content request associated with the token(s) is from an authenticated and authorized user. For example, validation operations may include comparing data included in tokens to determine whether data in different tokens matches and/or comparing data included in tokens to data maintained by second computing subsystem 104 to determine whether the tokens are valid and therefore indicative that a content request is from an authenticated and authorized user.

Figure 3:
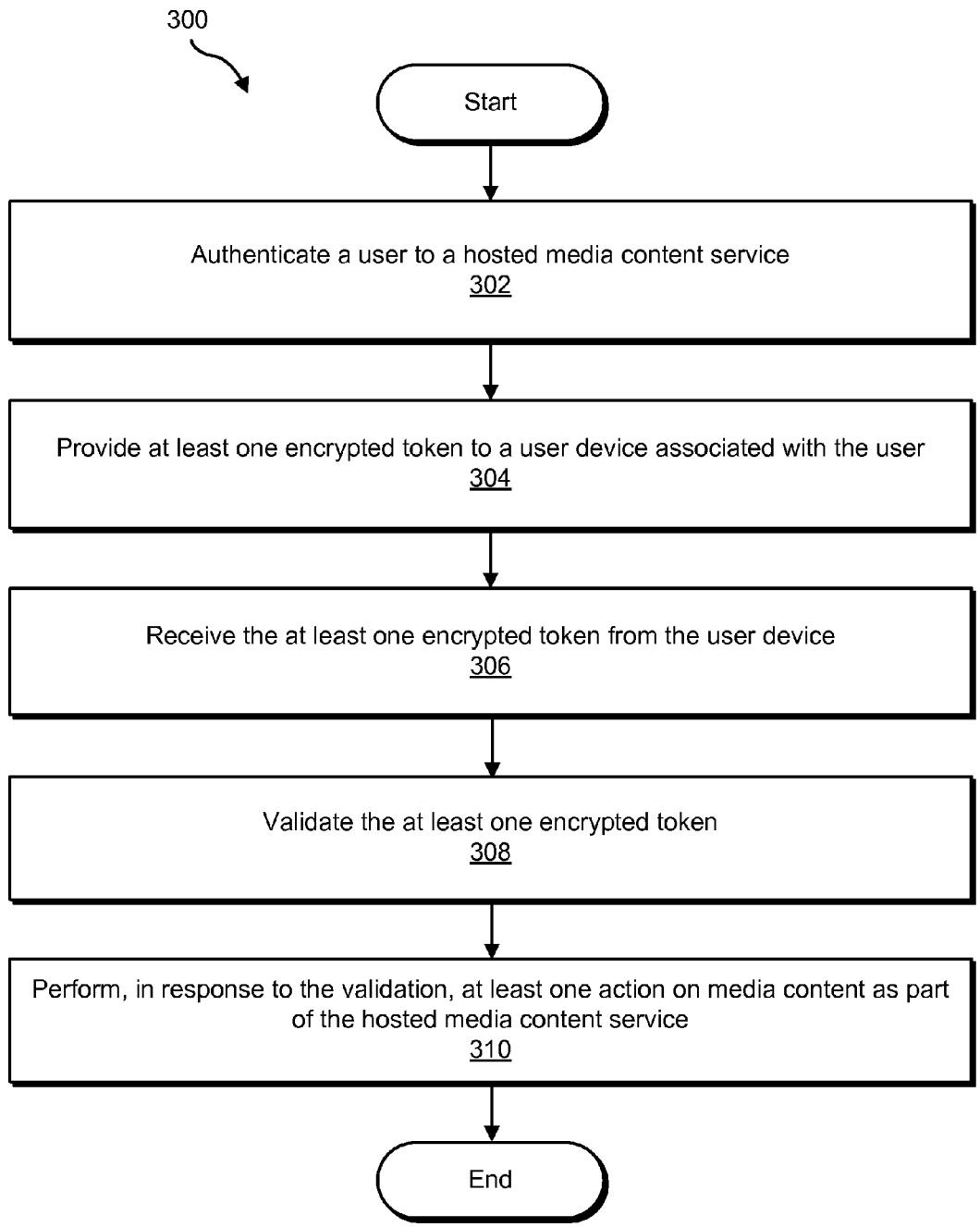
FIG. 3 illustrates an exemplary hosted media content service method according to principles described herein.

FIG. 3 illustrates an exemplary hosted media content service method 300. While FIG. 3 illustrates exemplary steps according to one embodiment, other embodiments may omit, add to, combine, reorder, and/or modify any of the steps shown in FIG. 3. In some examples, certain steps shown in FIG. 3 may be performed by first computing subsystem 102 and other steps shown in FIG. 3 may be performed by second computing subsystem 104, as described herein.

In step 302, first computing subsystem 102 may authenticate a user to a hosted media content service. Step 302 may be performed in any suitable way and using any suitable user authentication technologies. For example, first computing subsystem 102 may receive user credentials associated with the user from a user device and determine that the user credentials are valid. The determination may be made by comparing the user credentials received from the user device with registered user credentials stored in a database within first computing subsystem 102. If a match is found, first computing subsystem 102 determines that the user credentials received from the user device are valid and authenticates the user to the hosted media content service.

In step 304, first computing subsystem 102 may provide at least one encrypted token to the user device associated with the user. For example, first computing subsystem 102 may transmit one or more encrypted tokens, which may include any of the exemplary tokens described herein, to the user device.

In step 306, second computing subsystem 104 may receive the at least one encrypted token from the user device. As described above, the user device may be configured to forward encrypted tokens received from first computing subsystem 102 to second computing system 104. As mentioned, in certain examples, second computing subsystem 104 may receive the at least one encrypted token from the user device in association with a content request from the user device.

In step 308, second computing subsystem 104 may validate the at least one encrypted token received from the user device. Second computing subsystem 104 may validate the at least one encrypted token in any of the ways described herein. An exemplary validation of exemplary encrypted tokens is described in detail below.

In step 310, second computing subsystem 104 may perform, in response to the validation, at least one action on media content as part of the hosted media content service. In certain examples, the action may include facilitating uploading of media content from the user device to second computing subsystem 104. For instance, second computing subsystem 104 may receive the media content from the user device and store the media content to data storage within second computing subsystem 104. In other examples, the action may include facilitating downloading of media content from second computing subsystem 104 to the user device. For instance, second computing subsystem 104 may grant the user device access to the media content and transmit the media content to the user device.

Exemplary tokens and token operations that may be used in the disclosed hosted media content service systems and methods will now be described.

Figure 4:
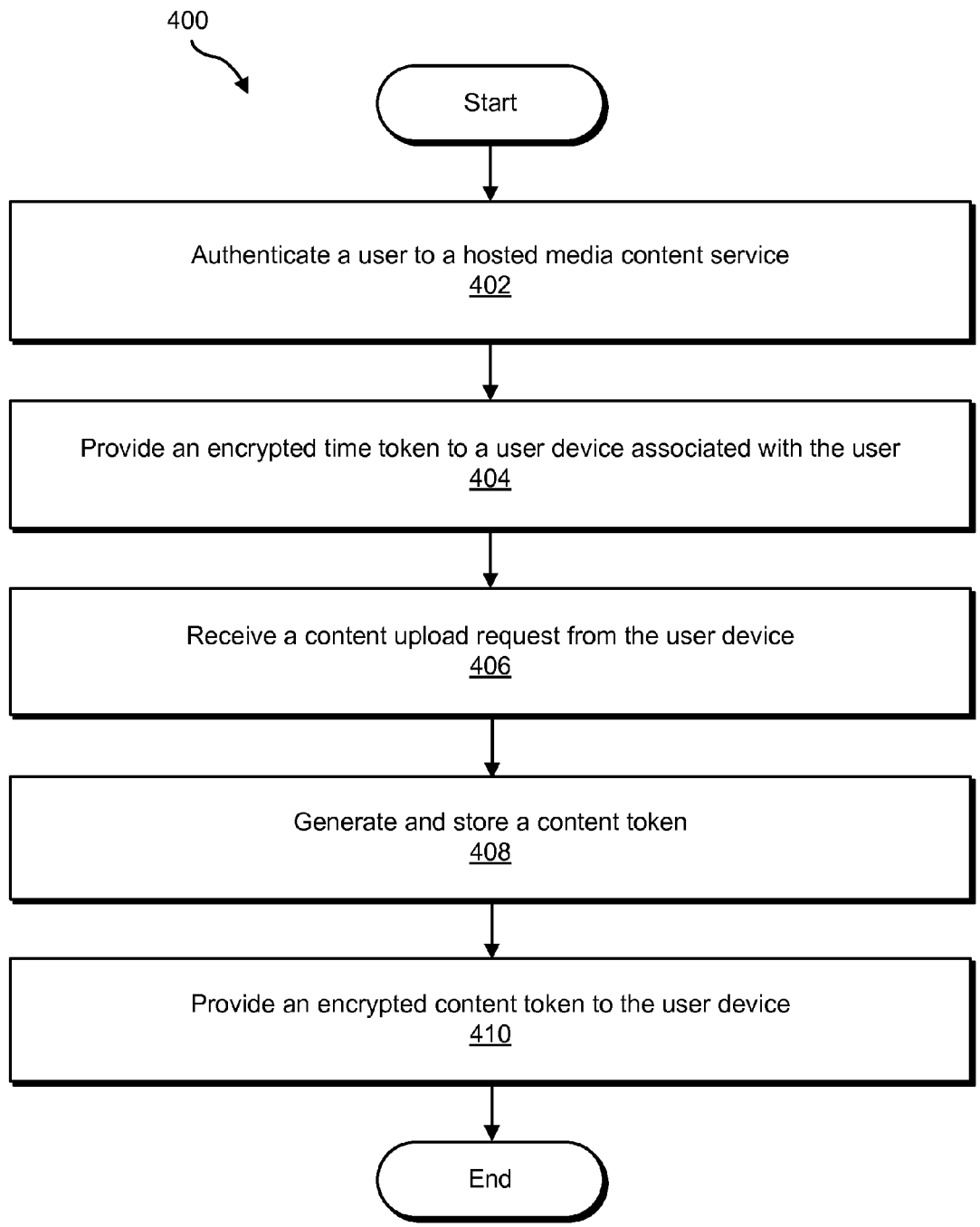
FIG. 4 illustrates another exemplary hosted media content service method according to principles described herein.

FIG. 4 illustrates another exemplary hosted media content service method 400 according to principles described herein. While FIG. 4 illustrates exemplary steps according to one embodiment, other embodiments may omit, add to, combine, reorder, and/or modify any of the steps shown in FIG. 4. The steps shown in FIG. 4 may be performed by any component or combination of components of first computing subsystem 102 and/or data center 202, as described herein.

In step 402, first computing subsystem 102 may authenticate a user to a hosted media content service. Step 402 may be performed in any of the ways described herein.

In step 404, first computing subsystem 102 may provide an encrypted time token to a user device associated with the user. In certain examples, step 404 may be performed in response to authentication of the user in step 402. For example, in response to a login of the user to the hosted media content service, first computing subsystem 102 may generate and transmit an encrypted time token to the user device associated with the user.

Figure 5:
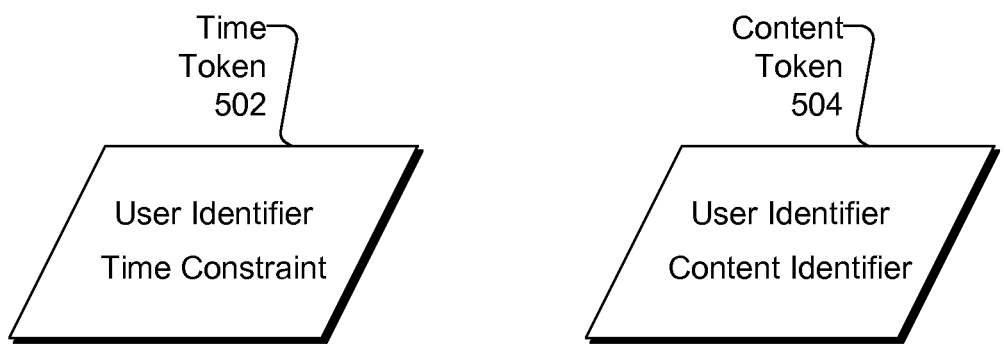
FIG. 5 illustrates exemplary tokens according to principles described herein.

The encrypted time token may include encrypted data representing a user identifier associated with the user and a time constraint indicating a time interval during which content requests from the user are considered to be valid. The time interval (e.g., a ten-minute interval) may begin when the user is authenticated and/or when the time token is generated or provided to the user device. FIG. 5 illustrates an exemplary time token 502 containing data representative of a user identifier and a time constraint. Time token 502 may include additional and/or alternative data as may suit a particular implementation.

The user device may receive and store the time token. The user device may be configured to begin a timed countdown in response to the receipt of the time token. Before the countdown reaches a predefined length of time, which length of time may be preconfigured to be shorter in duration than the time interval indicated by the time constraint included in the time token, the user device may send a request to the first computing subsystem 102 for a new time token. The request may be accompanied by any information that may be helpful in obtaining a new time token from first computing subsystem 102, including user credentials and/or the encrypted time token already received by the user device. In response to the request from the user device, first computing subsystem 102 may provide a new encrypted time token indicating a new time interval to the user device. Accordingly, the user device may continually request, receive, and store a new time token containing encrypted time constraint data.

Returning to FIG. 4, in step 406, first computing subsystem 102 may receive a content upload request from the user device. For example, the user may select a service option to upload media content, and in response the user device may transmit data representative of the content upload request to first computing subsystem 102, which may receive the content upload request. The content upload request may include any data associated with a request to upload content, including, without limitation, information identifying the media content to be uploaded, the user associated with the request, the user device associated with the request, and/or that the request is for an upload of media content.

In step 408, first computing subsystem 102 may generate and store a content token within first computing subsystem 102. In certain examples, step 408 may be performed in response to the receipt of the content upload request in step 406. The content token may include data representative of a user identifier indicating the user associated with the content upload request and a content identifier indicating the media content associated with the content upload request. FIG. 5 illustrates an exemplary content token 504 including data representative of a user identifier and a content identifier. Content token 504 may include additional and/or alternative data as may suit a particular implementation. For example, content token 504 may include data indicating a logical memory location in hosted storage to which uploaded media content is to be stored. As another example, content token 504 may include information about first computing subsystem 102 such that second computing subsystem 104 may determine from the content token the first computing subsystem 102 that received the content request from the user device.

In step 410 shown in FIG. 4, first computing subsystem 102 may provide an encrypted content token to the user device. In certain examples, step 410 may be performed in response to the receipt of the content upload request in step 406 and/or the generation and storage of the content token in step 408. For instance, after the content token is generated in step 408, first computing subsystem 102 may generate an encrypted copy of the content token and provide the encrypted content token to the user device.

Figure 6:
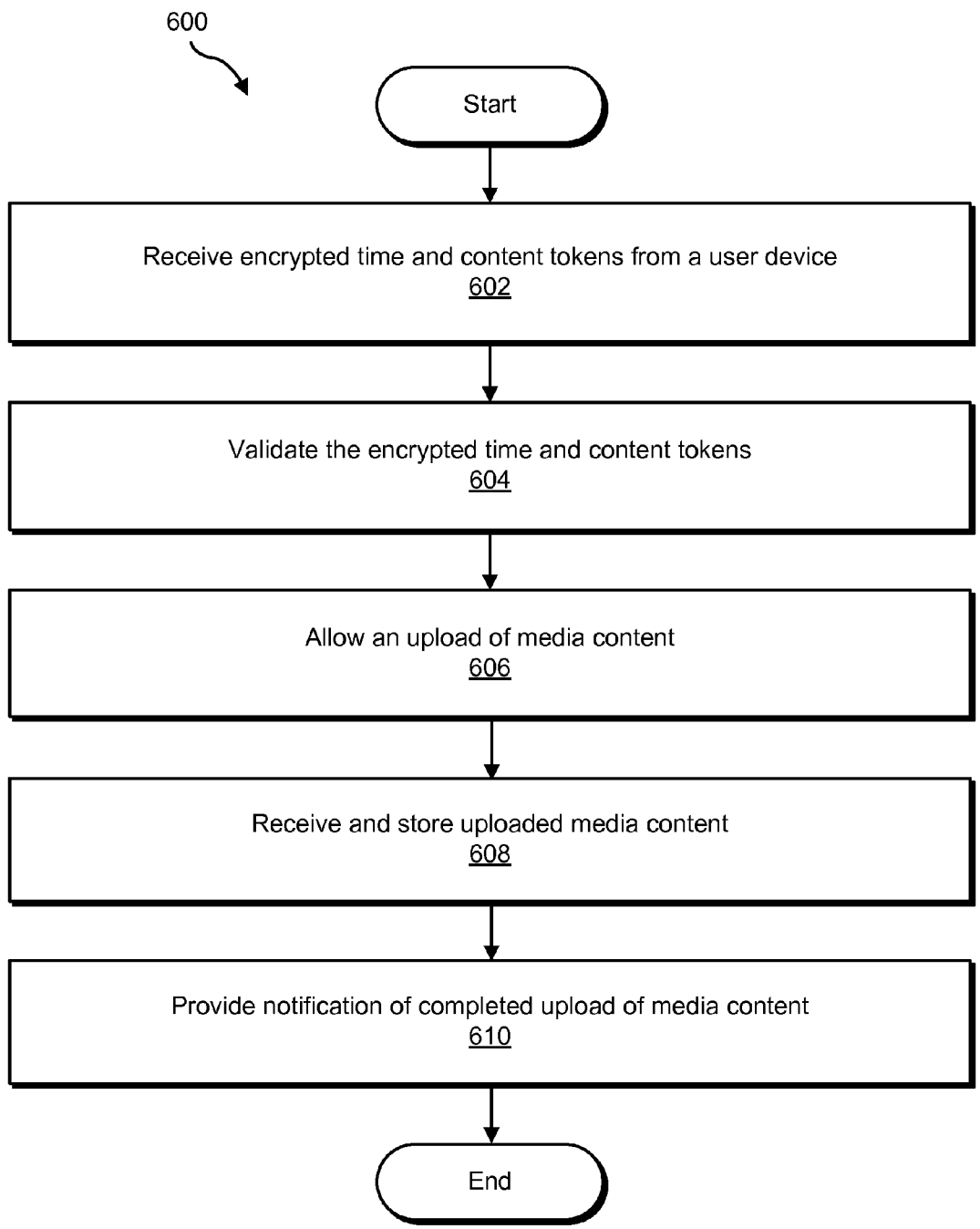
FIG. 6 illustrates another exemplary hosted media content service method according to principles described herein.

FIG. 6 illustrates another exemplary hosted media content service method 600. While FIG. 6 illustrates exemplary steps according to one embodiment, other embodiments may omit, add to, combine, reorder, and/or modify any of the steps shown in FIG. 6. The steps shown in FIG. 6 may be performed by any component or combination of components of second computing subsystem 104 and/or POP 204, as described herein. In certain examples, method 600 of FIG. 6 may be performed after the performance of method 400 of FIG. 4.

In step 602, second computing subsystem 104 may receive encrypted time and content tokens from a user device. To illustrate, the user device may receive the encrypted time and content tokens provided to the user device by first computing subsystem 102 in method 400, and forward the encrypted time and content tokens to second computing subsystem 104.

In certain examples, second computing subsystem 104 may receive a content upload request from the user device in conjunction with the receipt of the time and content tokens. For example, the user device may receive the encrypted time and content tokens provided by first computing subsystem 102 in method 400 in response to a content upload request provided by the user device to first computing subsystem 102. The user device may then transmit the content upload request and the encrypted time and content tokens to second computing subsystem 104. Thus, the encrypted time and content tokens received by second computing subsystem 104 in step 602 may include the exemplary time token 502 and content token 504 shown in FIG. 5.

In step 604, second computing subsystem 104 may validate the encrypted time and content tokens received in step 602. The validation may include second computing subsystem 104 decrypting the encrypted time and content tokens. By successfully decrypting the encrypted time and content tokens, second computing subsystem 104 may determine that there is an assurance that the encrypted time and content tokens were encrypted by first computing subsystem 102.

Additionally or alternatively, the validation may include second computing subsystem 104 determining that the user identifier included in the time token in the user identifier included in the content token match one another. By determining that the user identifier included in the time token and the user identifier included in the content token match one another, second computing subsystem 104 may determine that there is an assurance that the content upload request is from a user authenticated by first computing subsystem 102.

Additionally or alternatively, the validation may include second computing subsystem 104 determining that the time constraint included in the time token is satisfied. To determine that the time constraint in the time token is satisfied, second computing subsystem 104 may compare the time constraint to a clock reference maintained by second computing subsystem 104 or to a remote clock reference. In certain examples, first and second computing subsystems 102 and 104 may be configured to maintain equivalent and/or comparable clock references, such as clocks set to Greenwich Mean Time ("GMT") or another agreed upon time standard. By determining that the time constraint included in the time token is satisfied, second computing subsystem 104 may determine that there is an assurance that the request is received during an active and authenticated user session with the hosted media content service.

Additionally or alternatively, the validation may include second computing subsystem 104 determining that the user indicated by the user identifier included in either the time token or the content token has a user folder within a data file structure organization used to store hosted media content in second computing subsystem 104. By determining that there is a matching user folder in the hosted data storage, second computing subsystem 104 may associate uploaded media content stored in the data storage to the user by way of the data file structure organization in the hosted data storage. As described further below, this association may be used by second computing subsystem 104 to determine, based on the data file structure organization whether a user requesting access to hosted media content is authorized to access the media content.

By validating the encrypted time and content tokens in accordance with one or more of the above-described validation operations, second computing subsystem 104 may determine that there is an assurance that the content upload request associated with the time and content tokens is from an authenticated and authorized user of the hosted media content service.

In step 606, second computing subsystem 104 may allow an upload of media content. Step 606 may be performed in response to a content upload request from a user device and the validation of the encrypted time and content tokens in step 604 in association with the content upload request.

In step 608, second computing subsystem 104 may receive and store the uploaded media content. In certain examples, second computing subsystem 104 may be configured to store the uploaded media content in accordance with a predefined data file structure organization. For example, the media content may be stored within a folder associated with the user identified by the user identifier included in either of the time and content tokens.

In certain examples, in step 610, second computing subsystem 104 may provide notification of the completed upload of media content. The notification may be transmitted by second computing subsystem 104 to the user device and/or first computing subsystem 102 in any suitable way.

Methods 400 and 600 described above are directed to an exemplary uploading of media content to a hosted media content service. Exemplary methods directed to accessing of hosted media content will now be described. The methods may be performed independently of or in conjunction with the above-described uploading of media content.

Figure 7:
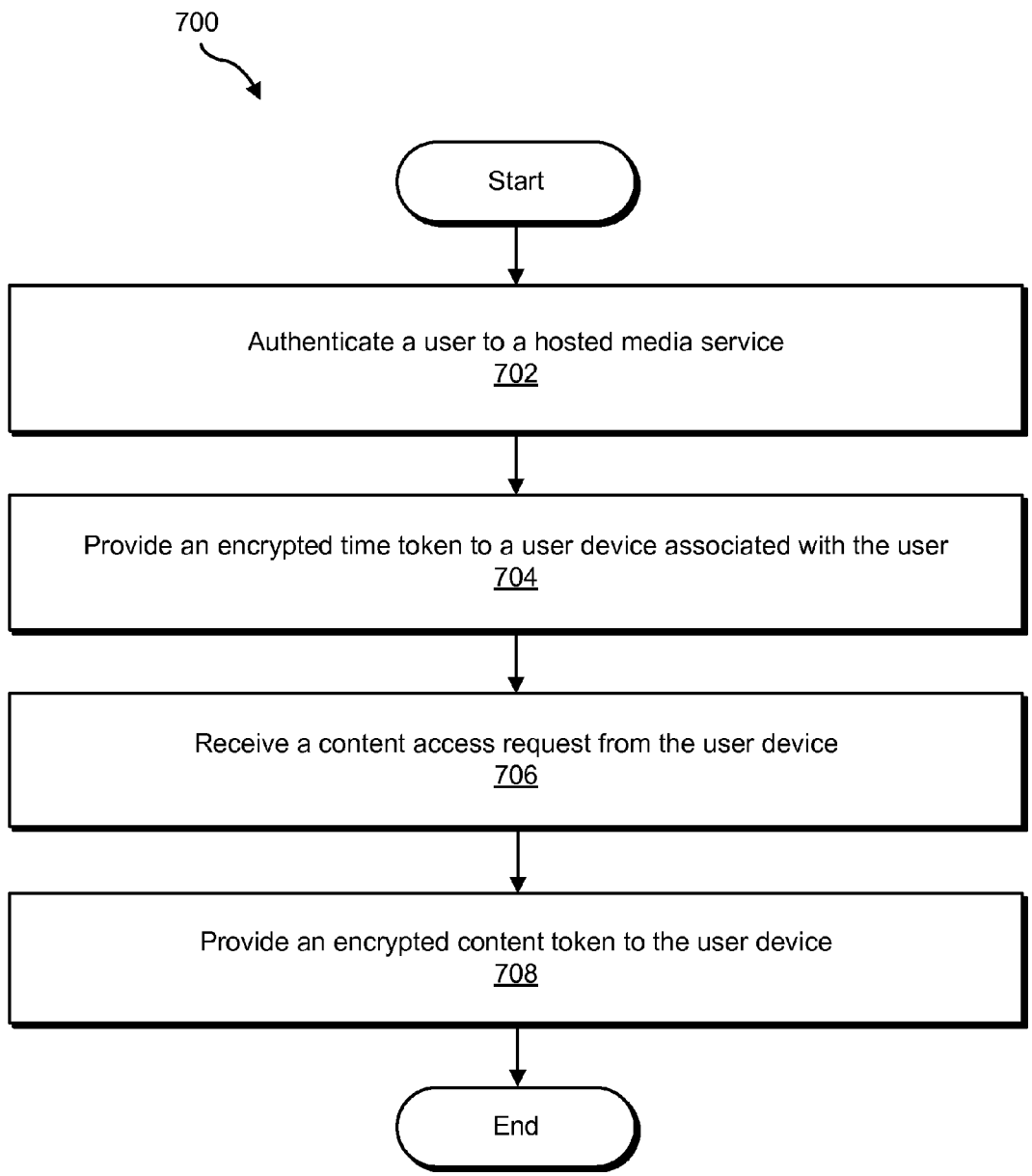
FIG. 7 illustrates another exemplary hosted media content service method according to principles described herein.

FIG. 7 illustrates another exemplary hosted media content service method 700. While FIG. 7 illustrates exemplary steps according to one embodiment, other embodiments may omit, add to, combine, reorder, and/or modify any of the steps shown in FIG. 7. The steps shown in FIG. 7 may be performed by any component or combination of components of first computing subsystem 102 and/or data center 202, as described herein.

In step 702, first computing subsystem 102 may authenticate a user to a hosted media content service. Step 702 may be performed in any of the ways described herein.

In step 704, first computing subsystem 102 may provide an encrypted time token to a user device associated with the user. Step 704 may be performed in any of the ways described herein. In certain examples, step 704 may be performed in response to authentication of the user in step 702. For example, in response to a login of the user to the hosted media content service, first computing subsystem 102 may generate and transmit an encrypted time token to the user device associated with the user.

The encrypted time token may include any of the encrypted time token data described herein, including the data included in time token 502 shown in FIG. 5. The user device may receive and store the time token.

In step 706, first computing subsystem 102 may receive a content access request from the user device. For example, the user may select a service option to access media content, and in response the user device may transmit data representative of the content access request to first computing subsystem 102, which may receive the content access request. The content access request may include any data associated with a request to access hosted media content, including, without limitation, information identifying the media content to be accessed, the user associated with the request, the user device associated with the request, and/or that the request is for access to media content.

In step 708, first computing subsystem 102 may provide an encrypted content token to the user device. In certain examples, step 708 may be performed in response to the receipt of the content access request in step 706. The encrypted content token may include any of the encrypted content token data described herein, including the data included in content token 504 shown in FIG. 5. The user device may receive and store the time token.

In certain examples, the encrypted content token provided to the user device in step 708 may include an encrypted copy of the content token generated and stored within first computing subsystem 102 in step 408 of method 400. In other words, a content token associated with a particular instance of media content may be generated and stored in first computing subsystem 102 in association with an upload of the media content instance. When a request to access the media content instance is received, first computing subsystem 102 may access the stored content token associated with the media content instance to generate and provide an encrypted copy of the content token to the user device from which the content access request is received.

Figure 8:
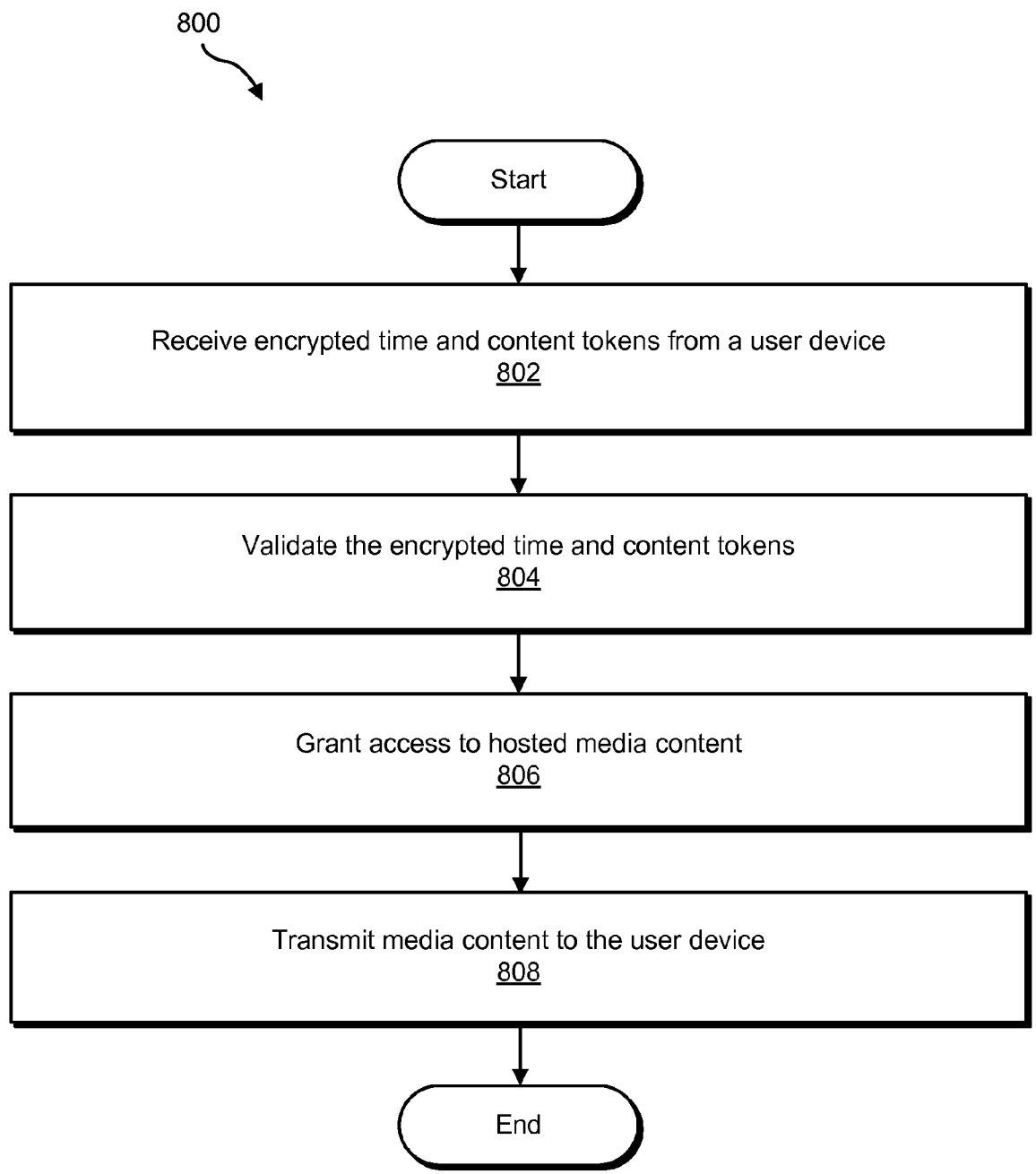
FIG. 8 illustrates another exemplary hosted media content service method according to principles described herein.

FIG. 8 illustrates another exemplary hosted media content service method 800. While FIG. 8 illustrates exemplary steps according to one embodiment, other embodiments may omit, add to, combine, reorder, and/or modify any of the steps shown in FIG. 8. The steps shown in FIG. 8 may be performed by any component or combination of components of second computing subsystem 104 and/or POP 204, as described herein. In certain examples, method 800 of FIG. 8 may be performed after the performance of method 700 of FIG. 7.

In step 802, second computing subsystem 104 may receive encrypted time and content tokens from a user device. To illustrate, the user device may receive the encrypted time and content tokens provided to the user device by first computing subsystem 102 in method 700, and forward the encrypted time and content tokens to second computing subsystem 104.

In certain examples, second computing subsystem 104 may receive a content access request from the user device in conjunction with the receipt of the time and content tokens. For example, the user device may receive the encrypted time and content tokens provided by first computing subsystem 102 in method 700 in response to a content access request provided by the user device to first computing subsystem 102. The user device may then transmit the content access request and the encrypted time and content tokens to second computing subsystem 104.

Figure 9:
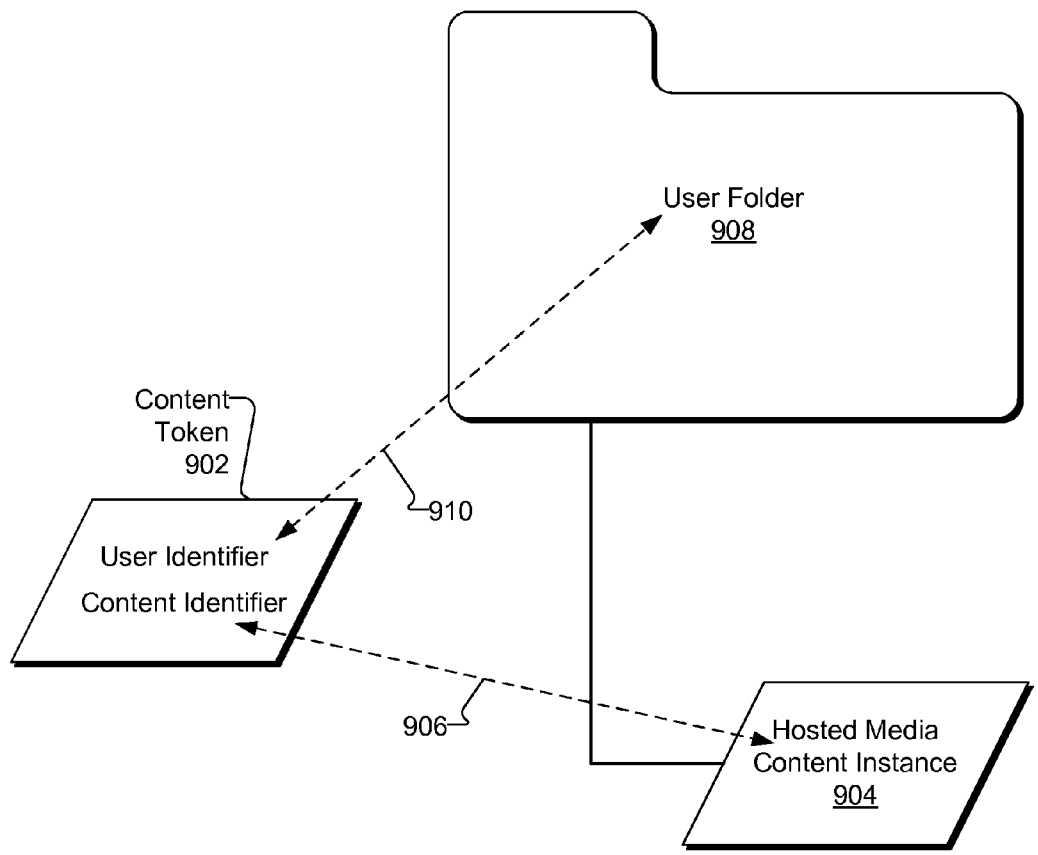
FIG. 9 illustrates an exemplary matching of token data to elements of a data file structure organization according to principles described herein.

In step 804, second computing subsystem 104 may validate the encrypted time and content tokens received in step 802. The validation may include one or more of the validation operations described above, including, for example, second computing subsystem 104 decrypting the encrypted time and content tokens, determining that the user identifier included in the time token in the user identifier included in the content token match one another, and determining that the time constraint included in the time token is satisfied. Additionally or alternatively, the validation in step 804 may include second computing subsystem 104 determining that the content identifier and the user identifier included in the content token match an organization of a data file structure used to store hosted media content within second computing subsystem 104. To illustrate, second computing subsystem 104 may be configured to store hosted media content in accordance with a predefined data file structure organization. In particular, media content associated with a particular user may be stored within a folder associated with the user, as described above. Accordingly, second computing subsystem 104 may determine that the content identifier included in the content token identifies hosted media content that is stored within a folder associated with the user identified by the user identifier contained in the content token. FIG. 9 illustrates an exemplary matching of a content identifier included in a content token 902 to a hosted media content instance 904 (represented by arrow 906 in FIG. 9) and of a user identifier included in the content token 902 to a user folder 908 (represented by arrow 910 in FIG. 9) within which the hosted media content instance is stored. By making this determination or match, second computing subsystem 104 may leverage a data file structure organization to determine that there is an assurance that the user identified by the user identifier is authorized to access the media content identified by the content identifier contained in the content token.

By validating the encrypted time and content tokens in accordance with one or more of the above-described validation operations, second computing subsystem 104 may determine that there is an assurance that the content access request associated with the time and content tokens is from an authenticated and authorized user of the hosted media content service.

In step 806, second computing subsystem 104 may grant access to hosted media content. Step 806 may be performed in response to a content access request from a user device and the validation of the encrypted time and content tokens in step 804 in association with the content access request.

In step 808, second computing subsystem 104 may transmit the requested media content to the user device. Step 808 may be performed in response to the granting of access to the hosted media content in step 806. The delivery of the hosted media content to the user device in step 808 may be performed in any suitable way, including by streaming the media content to the user device or downloading a copy of the media content to the user device, for example.

In certain embodiments, there is no communication between the first and second computing subsystems 102 and 104 in relation to the token validation operations described above. By being able to validate tokens independently of first computing subsystem 102, second computing subsystem 104 is able to produce rapid response times to content requests with an assurance that the content requests are from users who are authenticated to the hosted media content service by first computing subsystem 102.

Components of system 100 may utilize any suitable data communication technologies to support communications between the components.

While the examples described above related to a service for hosting media content, one or more of the principles described herein may be applied to other hosted services, including services for delivering third-party media content to users and/or services for hosting other types of digital content.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 10:
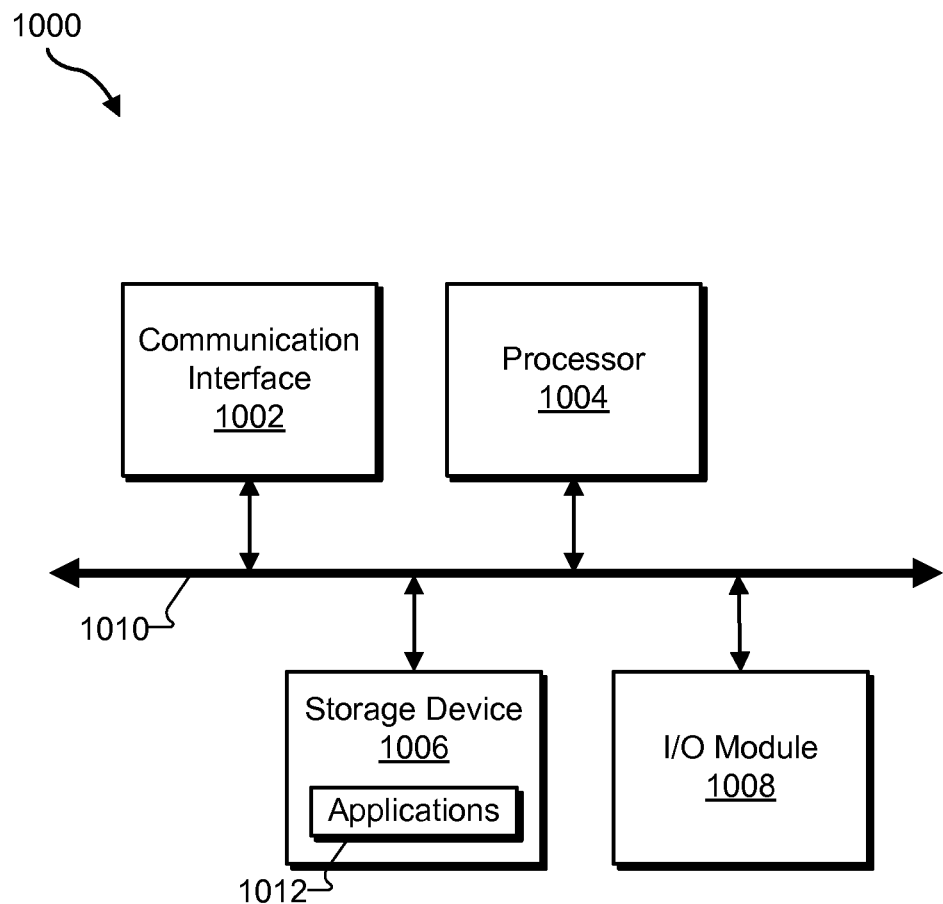
FIG. 10 illustrates an exemplary computing device according to principles described herein.

FIG. 10 illustrates an exemplary computing device 1000 that may be configured to perform one or more of the processes described herein. As shown in FIG. 10, computing device 1000 may include a communication interface 1002, a processor 1004, a storage device 1006, and an input/output ("I/O") module 1008 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, and any other suitable interface. Communication interface 1002 may additionally or alternatively provide such a connection through, for example, a local area network (such as an Ethernet network), a personal area network, a telephone or cable network, a satellite data connection, a dedicated URL, an Internet access network, an Internet backbone network, or any other suitable connection. Communication interface 1002 may be configured to interface with any suitable communication media, protocols, and formats.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another non-transitory computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1006. For example, data representative of one or more executable applications 1012 (which may include, but are not limited to, one or more of the software applications described herein) configured to direct processor 1004 to perform any of the operations described herein may be stored within storage device 1006. In some examples, data may be arranged in one or more databases residing within storage device 1006.

I/O module 1008 may be configured to receive user input and provide user output and may include any hardware, firmware, software, or combination thereof supportive of input and output capabilities. For example, I/O module 1008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1008 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
at least one computing device within a first computing subsystem associated with a hosted media content service, the at least one computing device configured to
authenticate a user to the hosted media content service, and
provide an encrypted time token and an encrypted content token to a user device associated with the user, the encrypted time token including a user identifier and a time constraint and the encrypted content token including a user identifier and a content identifier; and
at least one other computing device within a second computing subsystem associated with the hosted media content service, the at least one other computing device configured to
store hosted media content associated with the hosted media content service,
receive the encrypted time token and the encrypted content token from the user device,
validate the encrypted time token and the encrypted content token by
decrypting the encrypted time token and the encrypted content token,
determining that the user identifier included in the time token and the user identifier included in the content token match, and
determining that the time constraint included in the time token is satisfied, and
perform, in response to the validation, at least one action on media content as part of the hosted media content service.

2. The system of claim 1, wherein the at least one action comprises facilitating an uploading of the media content by the user device to the second computing subsystem or a downloading of the media content by the user device from the second computing subsystem.

3. The system of claim 2, wherein the validating further comprises determining that the uploading of the media content was requested by the user authenticated by the first computing subsystem.

4. The system of claim 1, wherein the at least one action comprises:
receiving the media content from the user device; and
storing the media content to a data storage within the second computing subsystem.

5. The system of claim 1, wherein the at least one action comprises:
granting the user device access to the media content; and
transmitting the media content to the user device.

6. The system of claim 1, wherein:
the first computing subsystem is located within a data center associated with the hosted media content service; and
the second computing subsystem is located within a point of presence to an Internet backbone network.

7. The system of claim 6, wherein the data center is located at a first physical site and the point of presence is located at a second physical site separate from the first physical site.

8. The system of claim 1, wherein there is no communication between the first computing subsystem and the second computing subsystem in relation to the validation of the encrypted time token and the encrypted content token.

9. The system of claim 1, wherein:
the first computing subsystem is configured to provide user authentication functionality for the hosted media content service; and
the second computing subsystem is not equipped to provide user authentication functionality for the hosted media content service.

10. The system of claim 1, wherein the at least one computing device within the first computing subsystem is configured to use a single-sign-on ("SSO") technology to authenticate the user for access to the hosted media content service.

11. The system of claim 1, wherein the at least one computing device within the first computing subsystem is configured to authenticate the user to the hosted media content service by
receiving user credentials for the user from the user device; and
determining that the user credentials are valid.

12. The system of claim 1, wherein the at least one other computing device within the second computing subsystem is further configured to validate the encrypted time token and the encrypted content token by determining that the content identifier and the user identifier included in the content token match an organization of a data file structure used to store the hosted media content.

13. The system of claim 12, wherein the determining that the content identifier and the user identifier match the organization of the data file structure used to store the hosted media content comprises determining that the content identifier is associated with hosted media content that is stored within a user folder that is associated with the user identifier.

14. The system of claim 1, wherein the validating further comprises determining that the encrypted time token and the encrypted content token were encrypted by the first computing subsystem.

15. The system of claim 1, wherein the determining that the time constraint included in the time token is satisfied comprises determining that the request is received during an active and authenticated user session with the hosted media content service.

16. A method comprising:
authenticating, by a first computing subsystem, a user to a hosted media content service;
providing, by the first computing subsystem, an encrypted time token and an encrypted content token to a user device associated with the user, the encrypted time token including a user identifier and a time constraint and the encrypted content token including a user identifier and a content identifier;
receiving, by a second computing subsystem separate from the first computing subsystem, the encrypted time token and the encrypted content token from the user device;
validating, by the second computing subsystem, the encrypted time token and the encrypted content token by decrypting the encrypted time token and the encrypted content token, determining that the user identifier included in the time token and the user identifier included in the content token match, and determining that the time constraint included in the time token is satisfied; and performing, by the second computing subsystem in response to the validation, at least one action on media content as part of the hosted media content service.

17. The method of claim 16, embodied as computer-executable instructions on at least one non-transitory computer-readable medium.

18. A method comprising:

authenticating, by a first computing subsystem, a user to a hosted media content service;

providing, by the first computing subsystem in response to the authenticating, an encrypted time token to a user device associated with the user, the encrypted time token including a user identifier and a time constraint;

receiving, by the first computing subsystem, a content upload request from the user device;

generating and storing, by the first computing subsystem in response to the content upload request, a content token including a user identifier and a content identifier;

providing, by the first computing subsystem, an encrypted copy of the content token to the user device;

receiving, by a second computing subsystem separate from the first computing subsystem, the encrypted time token and the encrypted content token from the user device;

validating, by the second computing subsystem, the encrypted time token and the encrypted content token by decrypting the encrypted time token and the encrypted content token, determining that the user identifier included in the time token and the user identifier included in the content token match, and determining that the time constraint included in the time token is satisfied;

allowing, by the second computing subsystem in response to the validation, an upload of media content from the user device; and receiving and storing, by the second computing subsystem, the uploaded media content to a data storage within the second computing subsystem.

19. The method of claim 18, further comprising:

receiving, by the first computing subsystem, a content access request from the user device; and providing, by the first computing subsystem in response to the receiving of the content access request, an encrypted copy of the content token to the user device.

20. The method of claim 19, further comprising:

receiving, by the second computing subsystem separate from the first computing subsystem, the encrypted time token and the encrypted content token provided by the first computing subsystem in response to the content access request from the user device;

validating, by the second computing subsystem, the encrypted time token and the encrypted content token by decrypting the encrypted time token and the encrypted content token, determining that the user identifier included in the time token and the user identifier included in the content token match, and determining that the time constraint included in the time token is satisfied;

granting, by the second computing subsystem in response to the validation, the user device access to hosted media content stored within the second computing subsystem; and transmitting, by the second computing subsystem, the media content to the user device.

21. The method of claim 18, wherein the validating further comprises determining that the encrypted time token and the encrypted content token were encrypted by the first computing subsystem.

22. The method of claim 18, wherein the validating further comprises determining that the content upload request is from the user authenticated by the first computing subsystem.

23. A method comprising:

authenticating, by a first computing subsystem, a user to a hosted media content service;

providing, by the first computing subsystem in response to the authenticating, an encrypted time token to a user device associated with the user, the encrypted time token including a user identifier and a time constraint;

receiving, by the first computing subsystem, a content access request from the user device;

providing, by the first computing subsystem in response to the content access request, an encrypted content token to the user device, the encrypted content token including a user identifier and a content identifier;

receiving, by a second computing subsystem separate from the first computing subsystem, the encrypted time and content tokens from the user device;

validating, by the second computing subsystem, the encrypted time and content tokens by decrypting the encrypted time and content tokens, determining that the user identifier included in the time token and the user identifier included in the content token match, and determining that the time constraint included in the time token is satisfied;

granting, by the second computing subsystem in response to the validation, the user device access to hosted media content stored within the second computing subsystem; and transmitting, by the second computing subsystem, the media content to the user device.

24. The method of claim 23, wherein the validating further comprises determining that the content identifier and the user identifier included in the content token match an organization of a data file structure used to store the hosted media content.

25. The method of claim 24, wherein the determining that the content identifier and the user identifier included in the content token match the organization of the data file structure used to store the hosted media content comprises determining that the content identifier is associated with hosted media content that is stored within a user folder that is associated with the user identifier.

* * * * *